US012799824B2

(12) United States Patent
McCloskey

(10) Patent No.: US 12,799,824 B2
(45) Date of Patent: Nov. 17, 2026

(54) EXTENSION LADDER SECURING DEVICE

(71) Applicant: Sean McCloskey, Downgintown, PA (US)

(72) Inventor: Sean McCloskey, Downgintown, PA (US)

(*) Notice: Subject to any disclaimer, the term of this patent is extended or adjusted under 35 U.S.C. 154(b) by 876 days.

(21) Appl. No.: 18/306,440

(22) Filed: Apr. 25, 2023

(65) Prior Publication Data

US 2023/0349236 A1 Nov. 2, 2023

Related U.S. Application Data

(60) Provisional application No. 63/335,476, filed on Apr. 27, 2022.

(51) Int. Cl.
*E06C 7/48* (2006.01)

(52) U.S. Cl.
CPC .................................... *E06C 7/486* (2013.01)

(58) Field of Classification Search
CPC . E06C 7/486; E06C 7/188; E06C 7/48; E06C 7/18; E06C 7/505; E06C 1/34; F16B 2/00; F16B 2/02; F16B 2/06; F16B 2/10; B25B 5/00; B25B 5/04; B25B 5/067
See application file for complete search history.

(56) References Cited

U.S. PATENT DOCUMENTS 3,910,380 A * 10/1975 Nameche .................. E06C 1/34 182/206
4,018,301 A * 4/1977 Nameche .................. E06C 7/48 182/206
7,185,739 B1 3/2007 Blehm
8,839,907 B2 9/2014 Davis, Jr.
9,404,306 B2 8/2016 Russell et al.
10,995,549 B2 * 5/2021 Kay ........................ E06C 7/188
12,359,509 B2 * 7/2025 Delaney .................... E06C 7/48
2005/0139425 A1 * 6/2005 Thomas .................... E06C 1/34 182/214
2008/0190692 A1 8/2008 Felk
2012/0160608 A1 6/2012 Davis, Jr.
2014/0041965 A1 2/2014 Hess et al.

FOREIGN PATENT DOCUMENTS

EP 2317063 A1 * 5/2011 ............... E06C 7/48
GB 2584103 A * 11/2020 ............... E06C 1/36

OTHER PUBLICATIONS

EP2317063A1 (Year: 2011).*
GB2476283A (Year: 2019).*

* cited by examiner

*Primary Examiner* — David E Martinez
(74) *Attorney, Agent, or Firm* — Brennan, Manna & Diamond, LLC

(57) ABSTRACT

A ladder securing device configured to attach to a rung(s) of an extension ladder using a pair of clamps and including a pair of pivotal clamp arms for securing to a desired structure or surface to which the ladder is to be secured. The device includes a pulley connected to a rope, wherein the rope is eased off and pulled to pivotally move the clamp arms to secure to the structure. The clamp arms are connected to pivotal blocks and a plurality of torsional springs provide smooth and slow movement of the clamp arms. For providing additional support, a connecting rod connects the clamp arms and a fastener secures the clamp arms.

20 Claims, 8 Drawing Sheets

EXTENSION LADDER SECURING DEVICE

CROSS-REFERENCE TO RELATED APPLICATION

The present application claims priority to, and the benefit of, U.S. Provisional Application No. 63/335,476, which was filed on Apr. 27, 2022, and is incorporated herein by reference in its entirety.

FIELD OF THE INVENTION

The present invention relates generally to the field of ladder stabilizing device. More specifically, the present invention relates to a novel ladder securing device for extension ladders, enabling users to attach the ladder to a gutter, roof, scaffolding, and more, with ease. The device has a pair of clamp arms, each having a swivel pad, wherein the clamps secure around a surface to secure the ladder enabling users to ascend and descend the ladder while the ladder remains stable against the desired structure or surface. Accordingly, the present disclosure makes specific reference thereto. Nonetheless, it is to be appreciated that aspects of the present invention are also equally applicable to other like applications, devices, and methods of manufacture.

BACKGROUND

By way of background, as a bricklayer, carpenter, gutter cleaner, roofers and more, safety is of paramount importance when working on different job sites. Ladders are an essential tool for reaching high places and getting work done, but they can be dangerous if not used properly. One common problem with ladders is maintaining stability when they are placed up against a wall, gutter, or building exterior. This can be especially difficult when working on uneven or sloped surfaces.

Conventionally, one or more additional individuals hold and stabilize a ladder while a person climbs and works while on the ladder. This requires additional manpower and results in additional cost. People also use ropes and other items to tie off the ladder and keep it stable against a desired surface. However, this method can be unreliable and even dangerous. If the ropes are not tied securely or if they slip, the ladder can become unstable and cause a fall. People desire a ladder securing system that can overcome the problems associated with conventional methods of securing ladders against a surface.

Therefore, there exists a long-felt need in the art for a ladder securing system that provides a safer and more reliable way to stabilize ladders. There is also a long-felt need in the art for a ladder securement system that obviates requirement of additional individuals to hold a ladder. Additionally, there is a long-felt need in the art for a ladder securing system that can be used with any type of surface for securing a ladder. Moreover, there is a long-felt need in the art for a ladder stabilizing device that obviates use of ropes for securing ladders against a surface. Further, there is a long-felt need in the art for a ladder securing device that avoids bad judgements and therefore decreases chances of incidence of injuries. Furthermore, there is a long-felt need in the art for a ladder securement device that allows users to ascend and descend the ladder while it remains stable against the desired structure. Finally, there is a long-felt need in the art for a ladder stabilizing system that prevents serious injury due to unstable ladders, which ultimately lead to falls.

The subject matter disclosed and claimed herein, in one embodiment thereof, comprises a ladder securing device for ladders. The device is attached to a rung of an extension ladder for securing the ladder to various surfaces, such as gutters, roofs, and scaffolding. The device includes a brace positioned between two steps or rungs of a ladder, a pair of hose clamps for securing the device to the ladder, a spacing tube extending transversely from the top ends of the opposite elongated edges of the brace, the spacing tube is positioned transverse to the secured ladder; a chamber or housing configured for housing a pair of pivot blocks, wherein the pair of pivot blocks is used for providing pivotal movement to an upper clamp arm and a lower clamp arm; each of the upper clamp arm and the lower clamp arm having a swivel pad along the curved distal ends thereof respectively, and a pulley disposed on the chamber and coupled to an elongated rope, wherein the rope can is eased off for pivotally moving the clamp arms enabling the upper clamp arm swivel pad and the lower clamp arm swivel pad to move towards each other until the pads abut against each other or any surface therebetween.

In this manner, the extension ladder securing device of the present invention accomplishes all of the forgoing objectives and provides users with a securement system for extension ladders, enabling users to attach the ladder to a gutter, roof, scaffolding, and more, with ease. The device is attached to a rung of the ladder and clamps onto a surface, thereby securing the device to the ladder and clamp arms secure the device and the ladder to the desired surface. The device obviates manual holding of a ladder and securing the ladder using ropes and other similar items.

SUMMARY OF THE INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a ladder securing device for ladders. The device is used for securing an extension ladder to various surfaces, such as gutters, roofs, and scaffolding. The device further comprising a one-piece brace with rounded corners and elongated edges having a length substantially equal to the space between two steps or rungs of a ladder, wherein the bottom lateral edge of the brace rests on one rung of the ladder; a pair of hose clamps positioned on the opposite ends of the top edge of the brace, wherein the first hose clamp secures a ladder by accommodating a portion of the rung using a first ladder rung stopper, and the second hose clamp secures the rung by accommodating another portion of the rung using a second ladder rung stopper; a spacing tube extending transversely from the top ends of the opposite elongated edges of the brace, wherein the spacing tube is supported by supporting gussets that help in pivotal movement of the spacing tube relative to the brace; a chamber configured for housing a pair of pivot blocks, wherein the pair of pivot blocks is used for providing pivotal movement of an upper clamp arm and a lower clamp arm; each of the upper clamp arm and the lower clamp arm having a swivel pad along the curved distal ends thereof respectively, and a pulley disposed on the chamber and coupled to an elongated rope, wherein the rope can be eased off or pulled by a user for pivotally moving the clamp arms enabling the upper clamp arm swivel pad and the lower clamp arm swivel pad to abut against each other or any surface therebetween for securing the device and the ladder.

In yet another embodiment, the upper clamp arm includes a pair of connected elongated edges, each edge having a respective curved distal end, each edge having an upper torsional spring extending from a notch to trailing edge of the spacing tube.

In yet another embodiment, the lower clamp arm includes a pair of connected elongated edges, each edge having a respective curved distal end, each edge having a lower torsional spring extending from a notch to trailing edge of spacing tube.

In yet another embodiment, a method of securing an extension ladder to a surface using a portable ladder securing device is described. The method includes the steps of providing the ladder securing device, the ladder securing device including a generally rectangular or square brace and a pair of hose clamps, a spacing tube, pivot blocks, and a plurality of torsional springs, a pulley and a pair of clamp arms; resting the bottom lateral edge of the brace on a first rung and securing the hose clamps to a second rung above the first rung for supporting the ladder; pulling the rope attached to the pulley to pivotally move the clamp arms towards each other until an upper swivel pad and a lower swivel pad abut against the surface to which the ladder is secured to; attaching the upper swivel pad and the lower swivel pad to the surface; and ascending and descending the ladder for performing an operation.

In yet another embodiment, the ladder securing device of the present invention is easily and efficiently manufactured, marketed and available to consumers in cost-effective manner and is easily used by users to ascend and descend the ladder while it remains stable against the desired structure or surface.

Numerous benefits and advantages of this invention will become apparent to those skilled in the art to which it pertains upon reading and understanding of the following detailed specification.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION OF THE PRESENT INVENTION

Figure 1:
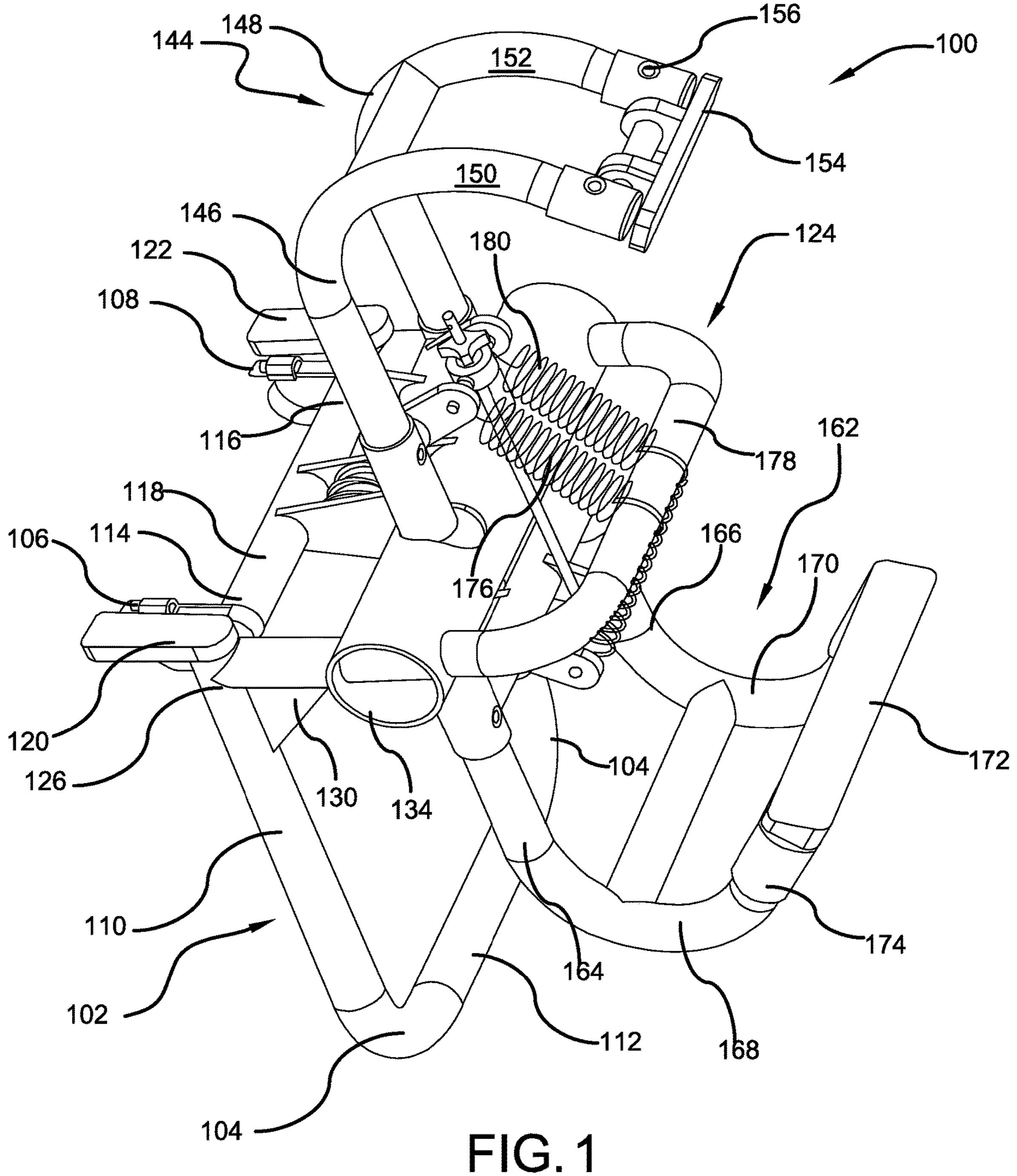
FIG. 1 illustrates a perspective view of one potential embodiment of a ladder securing device of the present invention in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there is a long-felt need in the art for a ladder securing system that provides a safer and more reliable way to stabilize ladders. There is also a long-felt need in the art for a ladder securement system that obviates requirement of additional individuals to hold a ladder. Additionally, there is a long-felt need in the art for a ladder securing system that can be used with any type of surface for securing a ladder. Moreover, there is a long-felt need in the art for a ladder stabilizing device that obviates use of ropes for securing ladders against a surface. Further, there is a long-felt need in the art for a ladder securing device that avoids bad judgements for ladder placement and therefore decreases chances of incidence of injuries. Furthermore, there is a long-felt need in the art for a ladder securement device that allows users to ascend and descend the ladder while it remains stable against the desired structure. Finally, there is a long-felt need in the art for a ladder stabilizing system that prevents serious injury due to unstable ladders which ultimately lead to falls.

The present invention, in one exemplary embodiment, is a method of securing an extension ladder to a surface using a portable ladder securing device. The method includes the steps of providing the ladder securing device, the ladder securing device including a generally rectangular or square brace and a pair of hose clamps, a spacing tube, pivot blocks, and a plurality of torsional springs, a pulley and a pair of clamp arms; resting the bottom lateral edge of the brace on a first rung and securing the hose clamps to a second rung, above the first rung, for supporting the ladder; pulling the rope attached to the pulley to pivotally move the clamp arms towards each other until an upper swivel pad and a lower swivel pad abut against the surface to which the ladder is secured to; attaching the upper swivel pad and the lower swivel pad to the surface; and ascending and descending the ladder for performing an operation.

Referring initially to the drawings, FIG. 1 illustrates a perspective view of one potential embodiment of ladder securing device of the present invention in accordance with the disclosed architecture. The ladder securing device 100 of the present invention is designed as a securement system for extension ladders, enabling users to attach the ladder to a gutter, roof, scaffolding, and more, with ease. More specifically, the ladder securing device 100 has a one-piece structure and includes a generally rectangular or square brace 102. The brace 102 has rounded corners 104 and has a pair of hose clamps 106, 108 (illustrated in FIG. 3 as well) for holding a step of a ladder being supported by the device 100 as illustrated in FIG. 4. The elongated edges 110 of the brace 102 have a length substantially equal to the space between two steps or rungs of a ladder such that the bottom lateral edge 112 of the brace 102 rests on one rung of the ladder and the hose clamps 106, 108 secure on another upper adjacent rung for supporting the ladder. The hose clamps 106, 108 are positioned on the opposite ends 114, 116 of the top edge 118 of the brace 102. The first hose clamp 106 secures a ladder by accommodating a portion of the rung using a first ladder rung stopper 120. Similarly, the second hose clamp 108 secures the rung by accommodating another portion of the rung using a second ladder rung stopper 122.

Figure 3:
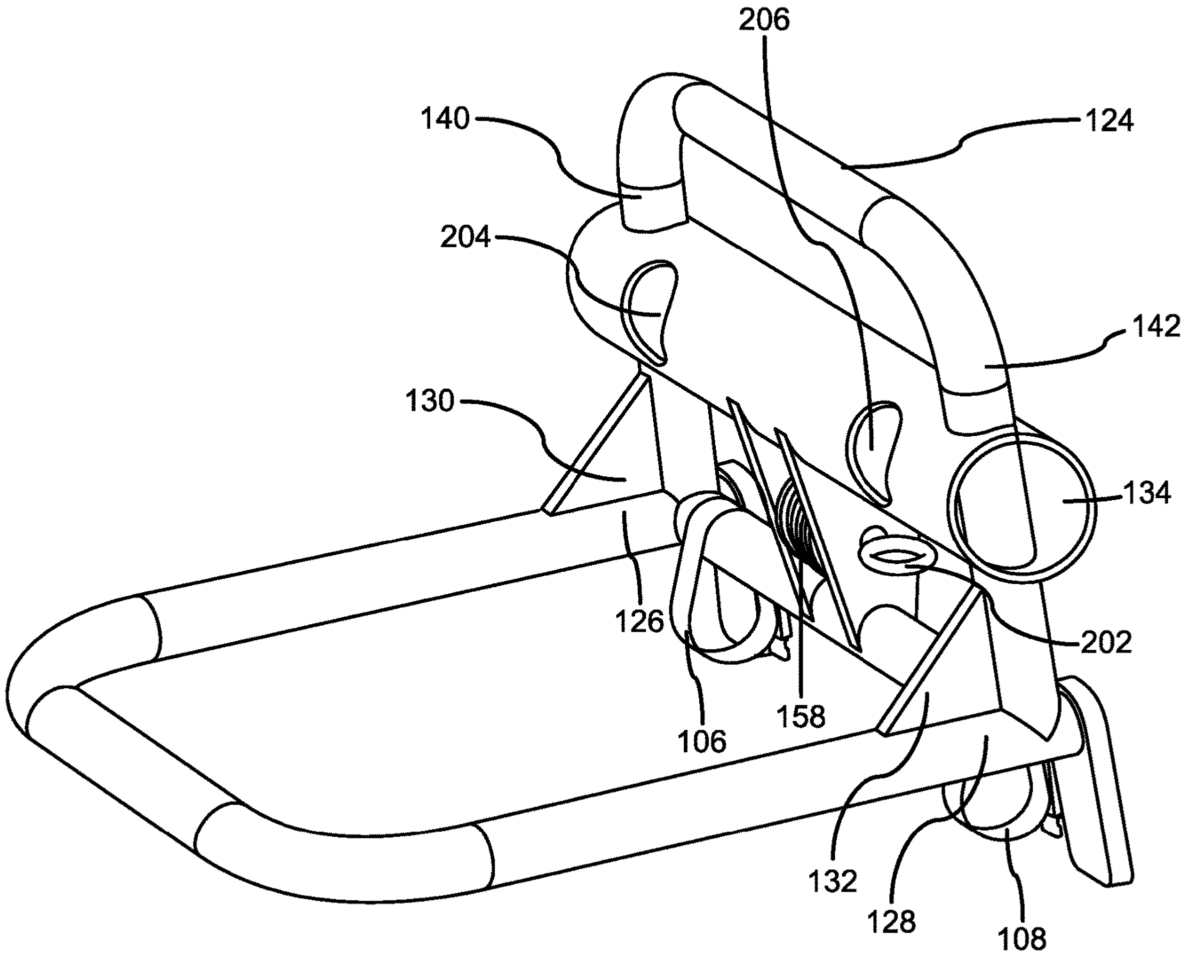
FIG. 3 illustrates a perspective view of the frame of the ladder supporting device without pivoting mechanism and the clamp arms in accordance with the disclosed architecture.
Figure 4:
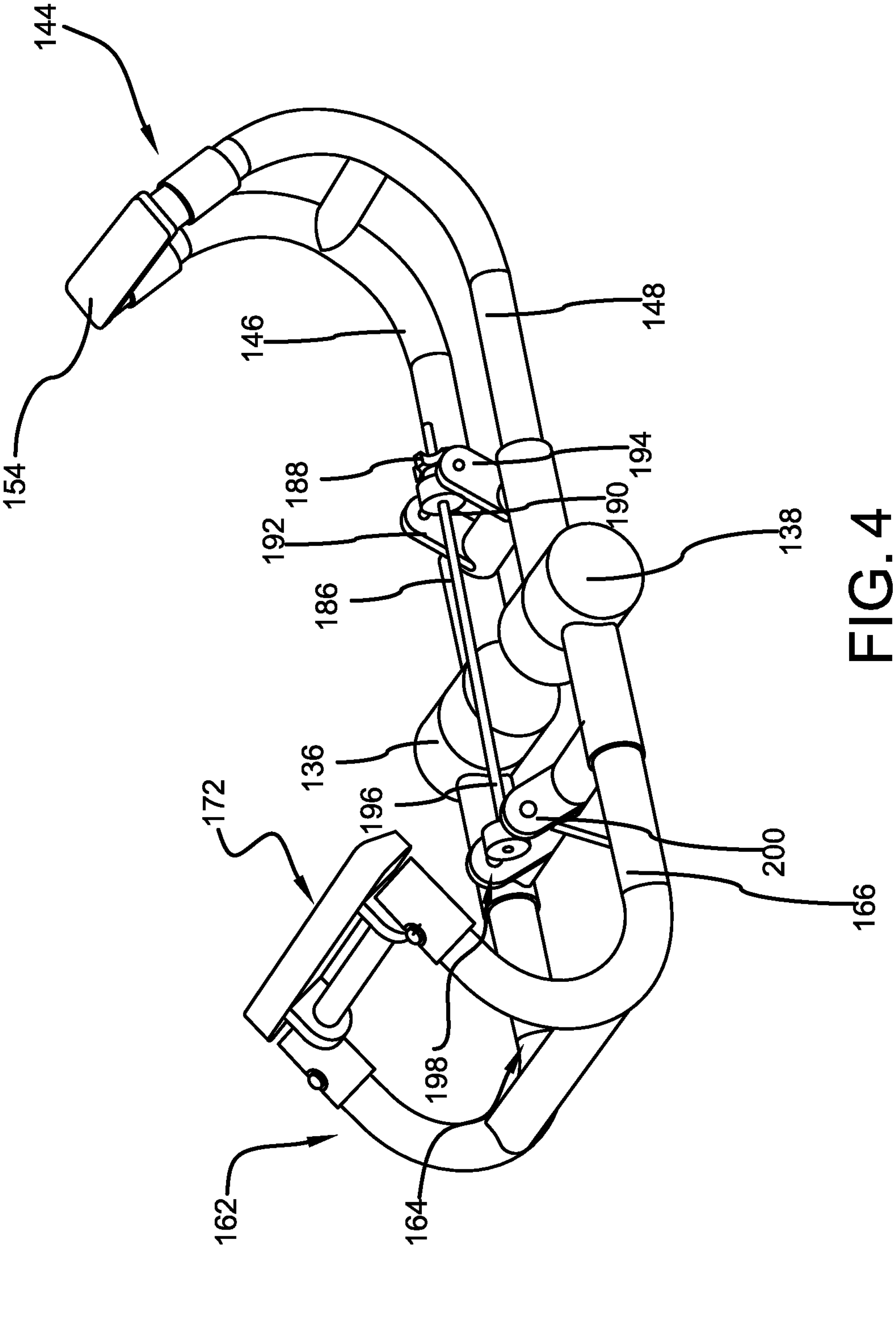
FIG. 4 illustrates a perspective view showing the clamp arms, pivot blocks of the ladder securement system of the present invention without the braces and spacing plate in accordance with the disclosed architecture.

A spacing tube 124 extends transversely from the top ends 126, 128 of the opposite elongated edges of the brace 102 as illustrated in FIG. 3. The spacing tube 124 is supported by supporting gussets 130, 132 as referred and illustrated in FIG. 3 wherein the gussets 130, 132 help in pivotal movement of the spacing tube 124 relative to the brace 102. A chamber 134 for housing a pair of pivot blocks 136, 138 (illustrated in FIG. 4) is disposed across the elongated edges 140, 142 (illustrated in FIG. 3) of the spacing tube 124. The pair of pivot blocks 136, 138 are used for providing pivotal movement of an upper clamp arm 144 relative to the chamber 134. The upper clamp arm 144 has a pair of connected elongated edges 146, 148, each edge having a respective curved distal end 150, 152. An upper swivel pad 154 is detachably attached to the distal ends 150, 152 along with snap on button 156 used for attaching other tools as per preferences and desires of an operator.

The pivot blocks 136, 138 of the chamber 134 are also configured for providing pivotal movement of a lower clamp arm 162 relative to the chamber 134 as illustrated in FIG. 4. The lower clamp arm 162 has a pair of connected elongated edges 164, 166, each edge having a respective curved distal end 168, 170. A lower swivel pad 172 is detachably attached to the distal ends 168, 170 along with snap on button 174.

Figure 2:
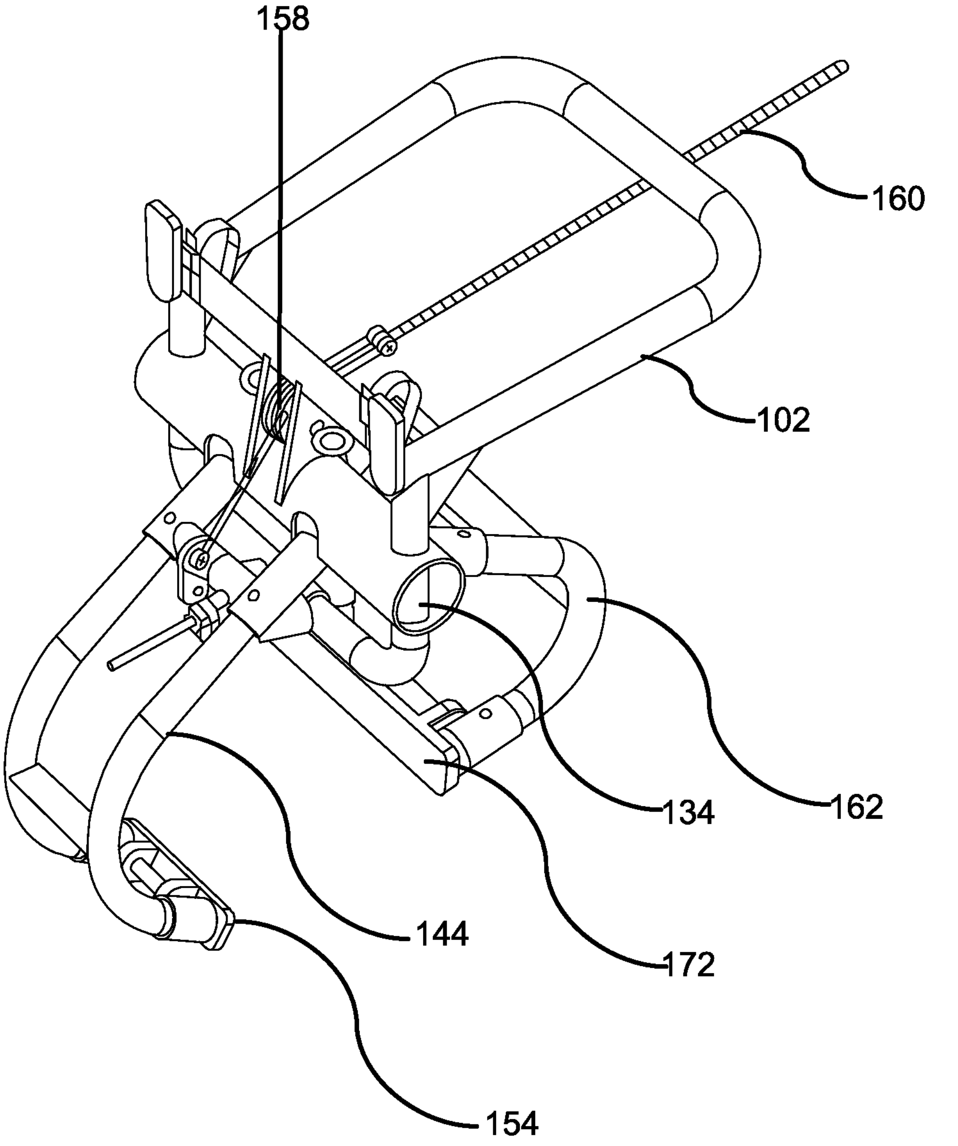
FIG. 2 illustrates another perspective view of the ladder supporting device of the present invention in accordance with the disclosed architecture.

A pulley 158 is disposed on the chamber 134 and is further coupled to an elongated rope 160 as illustrated in FIG. 2, wherein the rope 160 can be eased off by a user for pivotally moving the clamp arms 144, 162 enabling the upper swivel pad 154 and the lower swivel pad 172 to move towards each other until the pads 154, 172 abut against each other or any surface therebetween. Similarly, the rope 160 can be pulled to pull apart the swivel pads 154, 172 to release the device 100 from a surface. It should be noted that the in other embodiments, the rope 160 can be pulled to bring the clamp arms 144, 162 close to each other depending upon the design and structure of the device 100.

Figure 7:
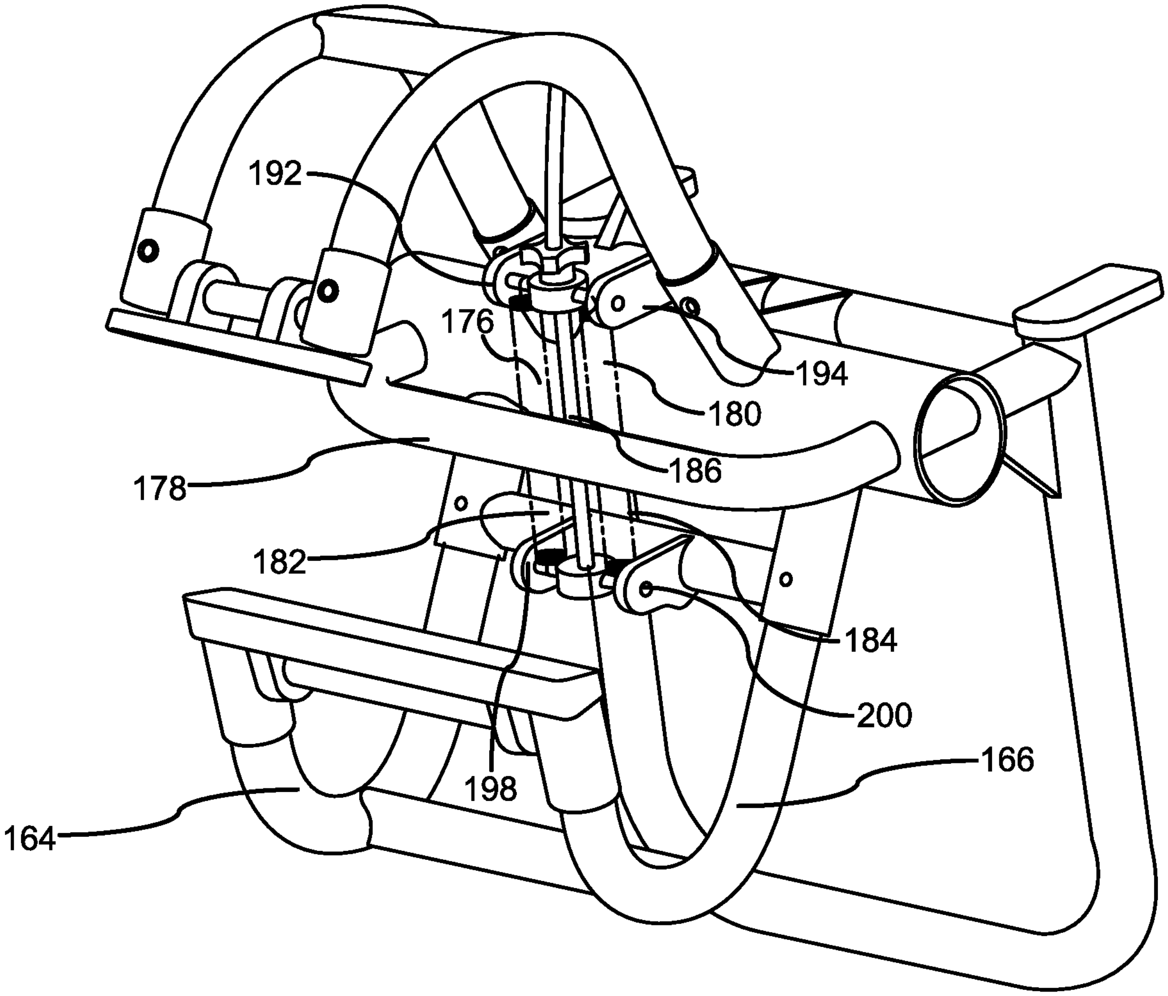
FIG. 7 illustrates another perspective view of the ladder securement system of the present invention in accordance with the disclosed architecture.

Referring to FIGS. 1 and 7, the device 100 uses a plurality of torsional springs for maintaining tension and easy movement of the clamp arms 144, 162 for the swivel pads 154, 172 to secure to a surface such as a roof, scaffolding and more. A first upper torsional spring 176 extends between the edge 146 of the upper clamp arm 144 and the trailing edge 178 of the spacing tube 124. Similarly, an identical second upper torsional spring 180 extends between the edge 148 and the trailing edge 178. The upper torsional springs 176, 180 allow a uniform and slow pivotal movement of the upper clamp arm 144. Similarly, a first lower torsional spring 182 extends between the edge 164 of the lower clamp arm 162 and the trailing edge 178 and a second lower torsional spring 184 extends between the edge 166 and the trailing edge 178.

Referring to FIGS. 1, 4, and 7, a connecting rod 186 along with a fastening screw 188 is used for connecting the upper clamp arm 144 and the lower clamp arm 162. One end 190 of the connecting rod 186 is fastened to a pair of pivotable notches 192, 194 of the upper clamp arm 144 and the opposite end 196 of the connecting rod 186 is fastened to another pair of pivotable notches 198, 200 of the lower clamp arm 162. It should be noted, referring to FIG. 7, that the first upper torsional spring 176 is connected to the notch 192 and the second upper torsional spring 180 is connected to the notch 194. Similarly, the first lower torsional spring 182 is connected to the notch 198 and the second lower torsional spring 184 is connected to the notch 200.

FIG. 2 illustrates another perspective view of the ladder supporting device of the present invention in accordance with the disclosed architecture. As illustrated, the rope 160 is wrapped around the pulley 158 and is connected to the connecting rod 186, thereby enabling the upper clamp arm 144 to pull away from the lower clamp arm 162. When the rope 160 is pulled, the upper torsional springs 176, 180 are extended, thereby enabling the upper clamp arm 144 to pull away.

The pulley 158 is disposed on the chamber 134, preferably around the center of the chamber 134 wherein a hinge 202 is used for rotation of the pulley 158 around the hinge 202 (FIG. 3). During turning of the pulley 158, the chamber 134 remains static and further, there is no movement in the brace 102 and the spacing tube 124.

FIG. 3 illustrates a perspective view of the frame of the ladder supporting device without pivoting mechanism and the clamp arms in accordance with the disclosed architecture. The supporting gussets 130, 132 are used for supporting the connection of the brace 102 and the spacing tube 124. As illustrated, the pulley arrangement 158 is disposed on the chamber 134 and is also connected to the 118 of the brace 102 enabling the hinge 202 to easily rotate along the hinge 202. The chamber 134 is hollow and the spacing tube 124 and the chamber 134 can be detachably attached or alternatively can be molded together. The hose clamp 106 and the corresponding rung stopper 120 together secure around a portion of a rung and similarly, the hose clamp 108 and the rung stopper 122 also secure around the rung.

The chamber 134 has a pair of pivot block openings 204, 206 for accommodating and securing the lower clamp arm 162 to the pivot blocks 136, 138. Similar, pivot block openings (not shown) are positioned for the upper clamp arm 144 for connecting to the pivot blocks 136, 138.

FIG. 4 illustrates a perspective view showing the clamp arms, pivot blocks of the ladder securement system of the present invention without the braces and spacing plate in accordance with the disclosed architecture. The upper clamp arm edge 146 and the lower clamp arm edge 164 are connected to the pivot block 136 for pivotal movement relative to each other. Similarly, the upper clamp arm edge 148 and the lower clamp arm edge 166 are connected to the pivot block 138. The swivel pads 154, 172 are non-slipping and can orient in different angles relative to the clamp arms 144, 162 respectively. The pivotable notches 192, 194 of the upper clamp arm 144 are attached to the edges 146, 148 respectively and the pivotable notches 198, 200 are attached to the edges 164, 166 respectively.

Figure 5:
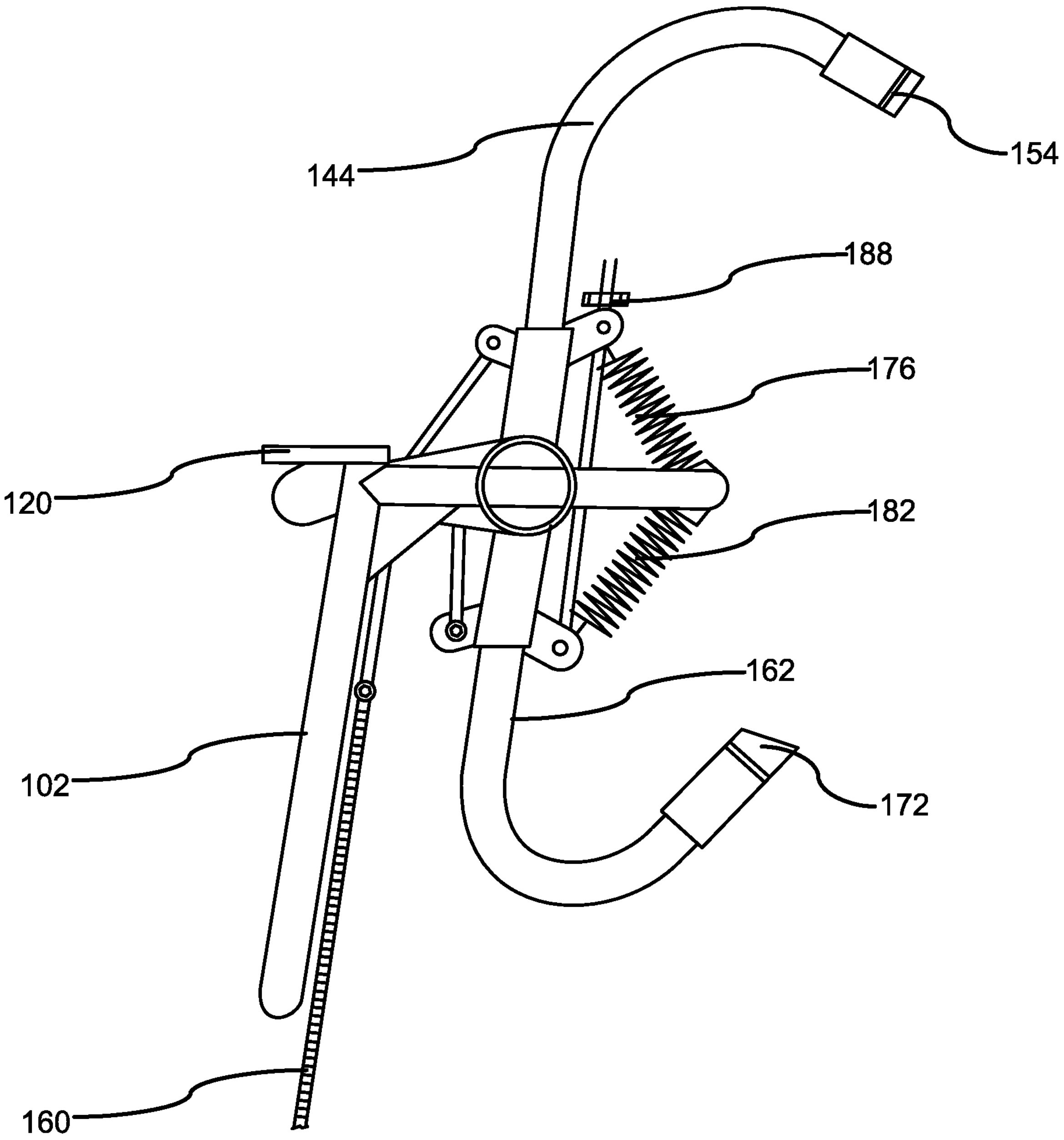
FIG. 5 illustrates an unclamped side perspective view of the ladder securement device of the present invention in accordance with the disclosed architecture.

FIG. 5 illustrates an unclamped side perspective view of the ladder securement device of the present invention in accordance with the disclosed architecture. The side perspective view shows the rope 160 is long enough for a user to easily hold to ease off and pull enabling the clamp arms 144, 162 towards each enabling the swivel pads 154, 172 to secure on opposite sides of a surface for securing the ladder. The rope 160 can be of nylon or any other material which provides a strong and effective force during pulling by a user. In an unclamped position, the brace 102 is substantially perpendicular to the spacing tube 124 with the rung stoppers or supporters 120, 122 also substantially perpendicular to the brace 102. The upper torsional springs and lower torsional springs shown by numerals 176, 182 are identical and have equal torsional strength, elasticity, and tension.

Figure 6:
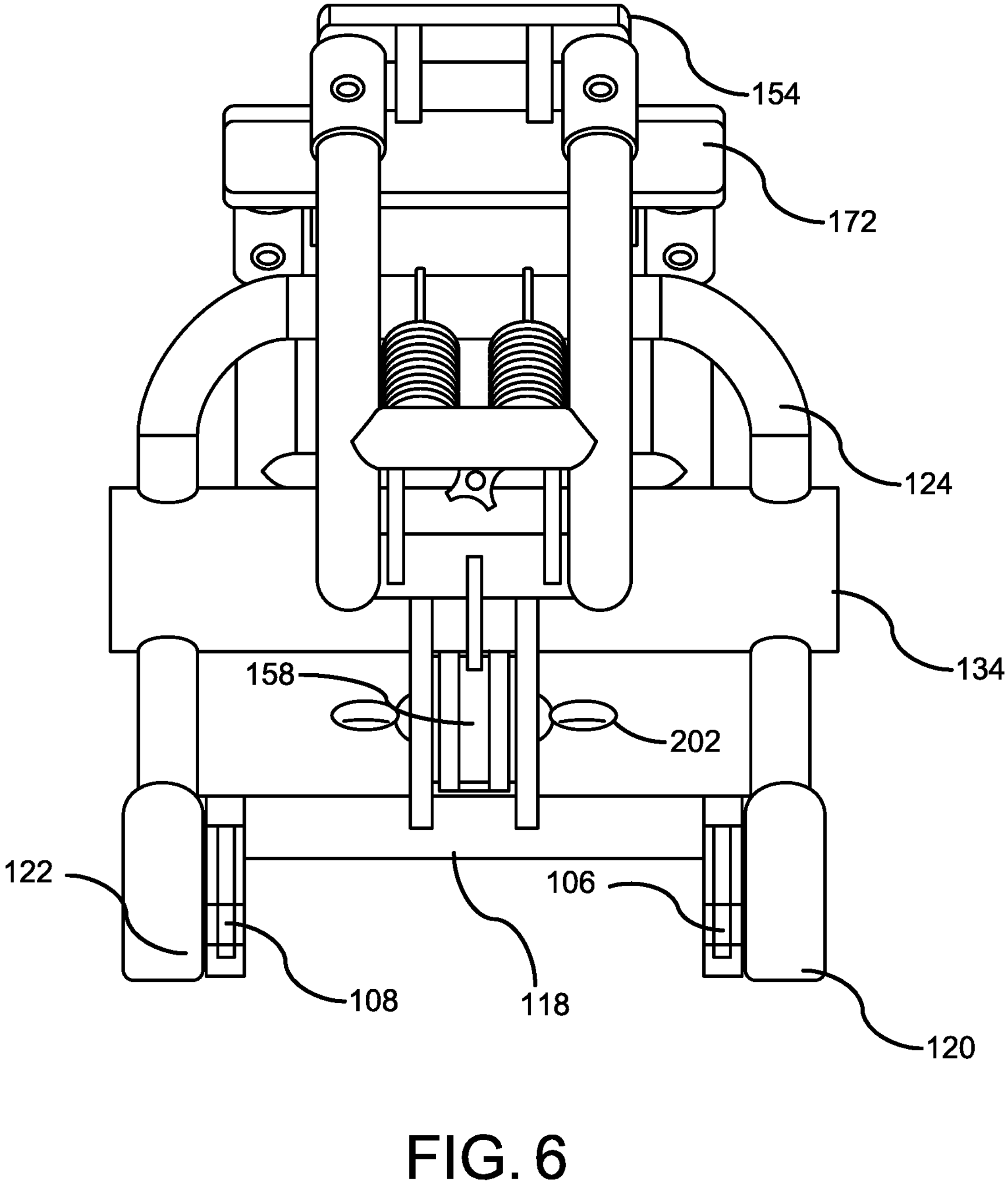
FIG. 6 illustrates a top perspective view of the ladder securing system of the present invention in an unclamped position in accordance with the disclosed architecture.

FIG. 6 illustrates a top perspective view of the ladder securing system of the present invention in an unclamped position in accordance with the disclosed architecture. The top perspective view displays the pulley 158 with the rope 160 wrapped thereon with the hinge 202 passing through the pulley 158. The hose clamp 106 and the rung stopper 120 are positioned nearby and work together to secure a ladder rung to the device 100. Similarly, the hose clamp 108 and the rung stopper 122 are positioned nearby and work together to further secure the rung to the device 100. The size of the clamp arms 144, 162 and the size of the swivel pads 154, 172 can be the same and alternatively can be of different sizes.

Figure 8:
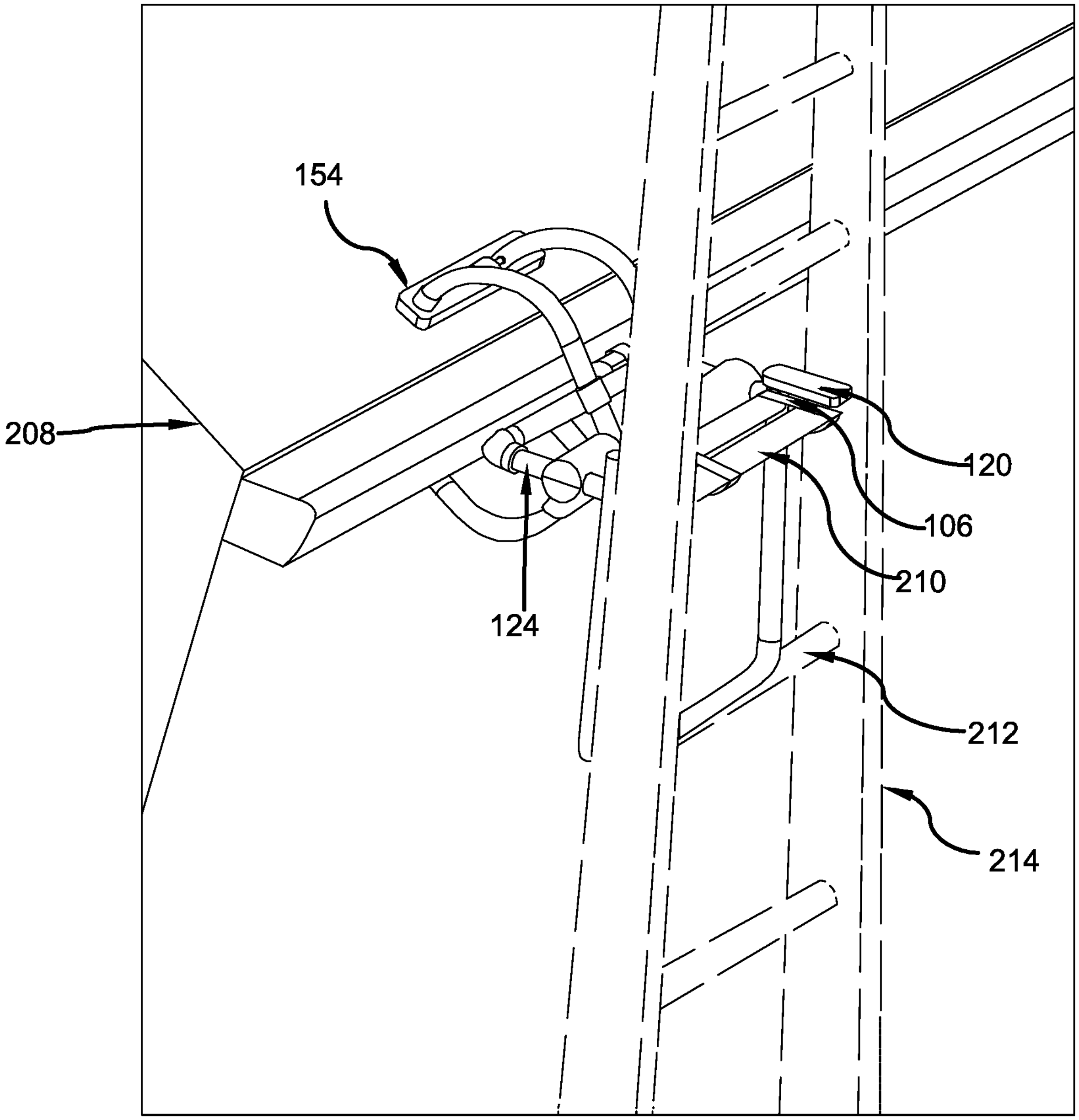
FIG. 8 illustrates a perspective view showing the ladder securing device of the present invention securing a ladder to a roof in accordance with the disclosed architecture.

FIG. 8 illustrates a perspective view showing the ladder securing device of the present invention securing a ladder to a roof in accordance with the disclosed architecture. The swivel pads 154, 172 are positioned on opposite sides of the supporting structure 208 such as a roof while the spacing tube 124 extends in substantial perpendicular direction to the brace 102. The hose clamps 106, 108 and the rung stoppers 120, 122 are positioned on a rung 210 with the brace 102 resting on the next lower rung 212, thereby securing the ladder 214. The ladder 214 using the device 100 does not touch the supporting structure 208 but remain static and stable with the support of the securing device 100. The clamps 144, 162 can be opened or pulled using the rope 160 and can also be tightened and secured using the connecting rod 186 along with the fastening screw 188 as illustrated in FIG. 4. The device 100 can be used for different surfaces like a gutter, roof, scaffolding, tree limb, and more. A user can easily ascend and descend the ladder 214 while the ladder 214 remains stable against the device 100.

Certain terms are used throughout the following description and claims to refer to particular features or components. As one skilled in the art will appreciate, different persons may refer to the same feature or component by different names. This document does not intend to distinguish between components or features that differ in name but not structure or function. As used herein "ladder securement device", "ladder securement system", "ladder securing device", and "device", are interchangeable and refer to the portable ladder securing and stabilizing device 100 of the present invention.

Notwithstanding the forgoing, the portable ladder securing and stabilizing device 100 of the present invention can be of any suitable size and configuration as is known in the art without affecting the overall concept of the invention, provided that it accomplishes the above-stated objectives. One of ordinary skill in the art will appreciate that the portable ladder securing and stabilizing device 100 as shown in the FIGS. are for illustrative purposes only, and that many other sizes and shapes of the portable ladder securing and stabilizing device 100 are well within the scope of the present disclosure. Although the dimensions of the portable ladder securing and stabilizing device 100 are important design parameters for user convenience, the portable ladder securing and stabilizing device 100 may be of any size that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A ladder securing device for extension ladders comprising:
- a securement device for attachment to an extension ladder having a brace and a pair of clamps for holding to a rung of the extension ladder being supported by said securement device;
- wherein said brace having a bottom lateral edge and elongated edges including a length substantially equal to a space defined between two adjacent rungs of the extension ladder;
- wherein said bottom lateral edge rests on one rung of the extension ladder and said pair of clamps secure to another upper adjacent rung for supporting the extension ladder;
- wherein said pair of clamps are positioned on opposite ends of a top edge of said brace;
- wherein a first clamp of the pair of clamps secures the extension ladder by surrounding a portion of said another upper adjacent rung having a first ladder rung stopper, and a second clamp of the pair of clamps secures the extension ladder by surrounding another portion of said another upper adjacent rung having a second ladder rung stopper;
- a chamber for housing a pair of pivot blocks is disposed across opposing elongated edges of a spacing tube;
- wherein said pair of pivot blocks is used for providing pivotal movement of an upper clamp arm relative to said chamber;

wherein said upper clamp arm having a pair of connected elongated edges;

wherein one of each said pair of connected elongated edges of said upper clamp arm having a curved distal end; and an upper swivel pad selectively attached to opposing said curved distal ends of said upper clamp arm.

2. The ladder securing device for extension ladders of claim 1, wherein at least one of said opposing curved distal ends of said upper clamp arm having an upper snap on button for attaching tools thereto.

3. The ladder securing device for extension ladders of claim 2, wherein said clamps are hose clamps.

4. The ladder securing device for extension ladders of claim 1 further comprising a spacing tube extending transversely from top ends of opposing elongated edges of said brace.

5. The ladder securing device for extension ladders of claim 4, wherein said spacing tube is supported by a pair of supporting gussets.

6. The ladder securing device for extension ladders of claim 5, wherein said pair of pivot blocks provide pivotal movement of a lower clamp arm relative to said chamber.

7. The ladder securing device for extension ladders of claim 6, wherein said lower clamp arm having a pair of connected elongated edges.

8. The ladder securing device for extension ladders of claim 7 wherein one of each said pair of connected elongated edges of said lower clamp arm having a curved distal end, and further comprising a lower swivel pad selectively attached to opposing said curved distal ends of said lower clamp arm.

9. The ladder securing device for extension ladders of claim 8, wherein at least one of said opposing curved distal ends of said lower clamp arm having a lower snap on button for attaching tools thereto.

10. A ladder securing device for extension ladders comprising:

a securement device for attachment to an extension ladder having a brace and a pair of clamps for holding to a rung of the extension ladder being supported by said securement device;

wherein said brace having a bottom lateral edge and elongated edges including a length substantially equal to a space defined between two adjacent rungs of the extension ladder;

wherein said bottom lateral edge rests on one rung of the extension ladder and said pair of clamps secure to another upper adjacent rung for supporting the extension ladder;

wherein said pair of clamps are positioned on opposite ends of a top edge of said brace;

wherein a first clamp of the pair of clamps secures the extension ladder by surrounding a portion of said one another upper adjacent rung having a first ladder rung stopper, and a second clamp of the pair of clamps secures the extension ladder by surrounding another portion of said ene another upper adjacent rung having a second ladder rung stopper;

a chamber for housing a pair of pivot blocks is disposed across opposing elongated edges of a spacing tube;

wherein said pair of pivot blocks is used for providing pivotal movement of an upper clamp arm and a lower clamp arm relative to said chamber;

wherein said upper clamp arm having a pair of connected elongated edges;

wherein one of each said pair of connected elongated edges of said upper clamp arm having a curved distal end;

an upper swivel pad selectively attached to opposing said curved distal ends of said upper clamp arm;

a pulley attached to said chamber and further coupled to a rope; and further wherein said rope pulled and released for pivotally moving said upper clamp arm and said lower clamp arm.

11. The ladder securing device for extension ladders of claim 10, wherein one of each said pair of connected elongated edges of said lower clamp arm having a curved distal end, and further comprising a lower swivel pad selectively attached to opposing said curved distal ends of said lower clamp arm.

12. The ladder securing device for extension ladders of claim 10, wherein releasing on said rope pivots said upper swivel pad and said lower swivel pad towards each other until said upper swivel pad and said lower swivel pad abut against a support surface therebetween.

13. The ladder securing device for extension ladders of claim 12, wherein pulling on said rope pivots said upper swivel pad and said lower swivel pad away from each other until said upper swivel pad and said lower swivel pad release from the support surface therebetween.

14. The ladder securing device for extension ladders of claim 10, wherein pulling on said rope pivots said upper swivel pad and said lower swivel pad towards each other until said upper swivel pad and said lower swivel pad abut against a support surface therebetween.

15. The ladder securing device for extension ladders of claim 10, wherein said pair of pivot blocks provide pivotal movement of said lower clamp arm relative to said chamber.

16. A ladder securing device for extension ladders comprising:

a securement device for attachment to an extension ladder having a brace and a pair of clamps for holding to a rung of the extension ladder being supported by said securement device;

wherein said brace having a bottom lateral edge and elongated edges including a length substantially equal to a space defined between two adjacent rungs of the extension ladder;

wherein said bottom lateral edge rests on one rung of the extension ladder and said pair of clamps secure to another upper adjacent rung for supporting the extension ladder;

wherein said pair of clamps are positioned on opposite ends of a top edge of said brace;

wherein a first clamp of the pair of clamps secures the extension ladder by surrounding a portion of said ene another upper adjacent rung having a first ladder rung stopper, and a second clamp of the pair of clamps secures the extension ladder by surrounding another portion of said one another upper adjacent rung having a second ladder rung stopper;

a chamber for housing a pair of pivot blocks is disposed across opposing elongated edges of a spacing tube;

wherein said pair of pivot blocks is used for providing pivotal movement of an upper clamp arm and a lower clamp arm relative to said chamber; and further wherein said upper clamp arm and said lower clamp arm having torsional springs connected thereto for maintaining tension therebetween.

17. The ladder securing device for extension ladders of claim 16, wherein said upper clamp arm having a pair of connected elongated edges, wherein one of each said pair of connected elongated edges of said upper clamp arm having a curved distal end, and further comprising an upper swivel pad selectively attached to opposing said curved distal ends of said upper clamp arm.

18. The ladder securing device for extension ladders of claim 16 further comprising a pulley attached to said chamber and further coupled to a rope, wherein said rope pulled and released for pivotally moving said upper clamp arm and said lower clamp arm.

19. The ladder securing device for extension ladders of claim 16 further comprising a connecting rod having a fastener for connecting said upper clamp arm and said lower clamp arm.

20. The ladder securing device for extension ladders of claim 19, wherein one end of said connecting rod is fastened to a pair of pivotable notches of said upper clamp arm and another end of said connecting rod is fastened to another pair of pivotable notches of said lower clamp arm.

* * * * *